United States Patent Office 3,096,419
Patented July 2, 1963

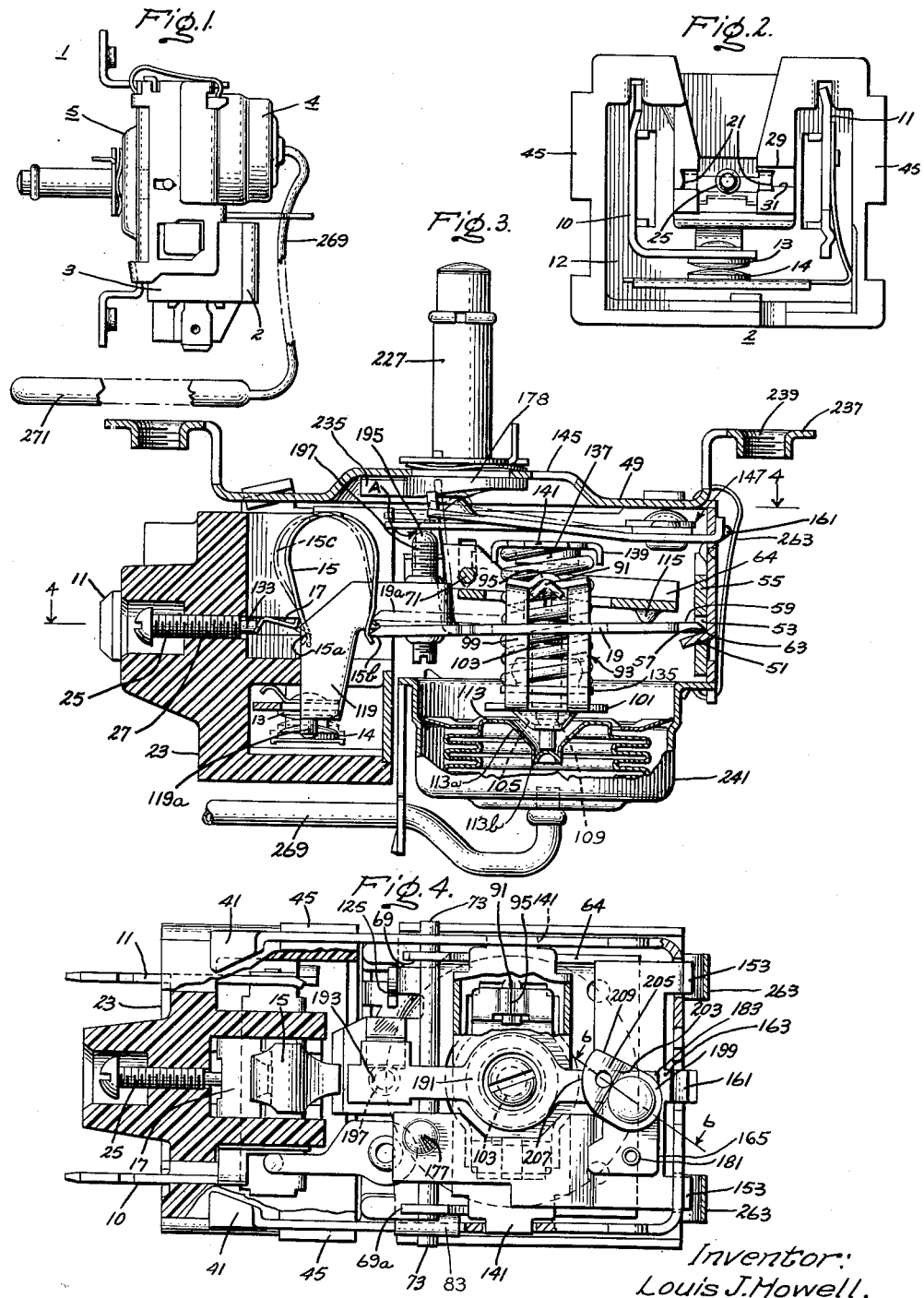

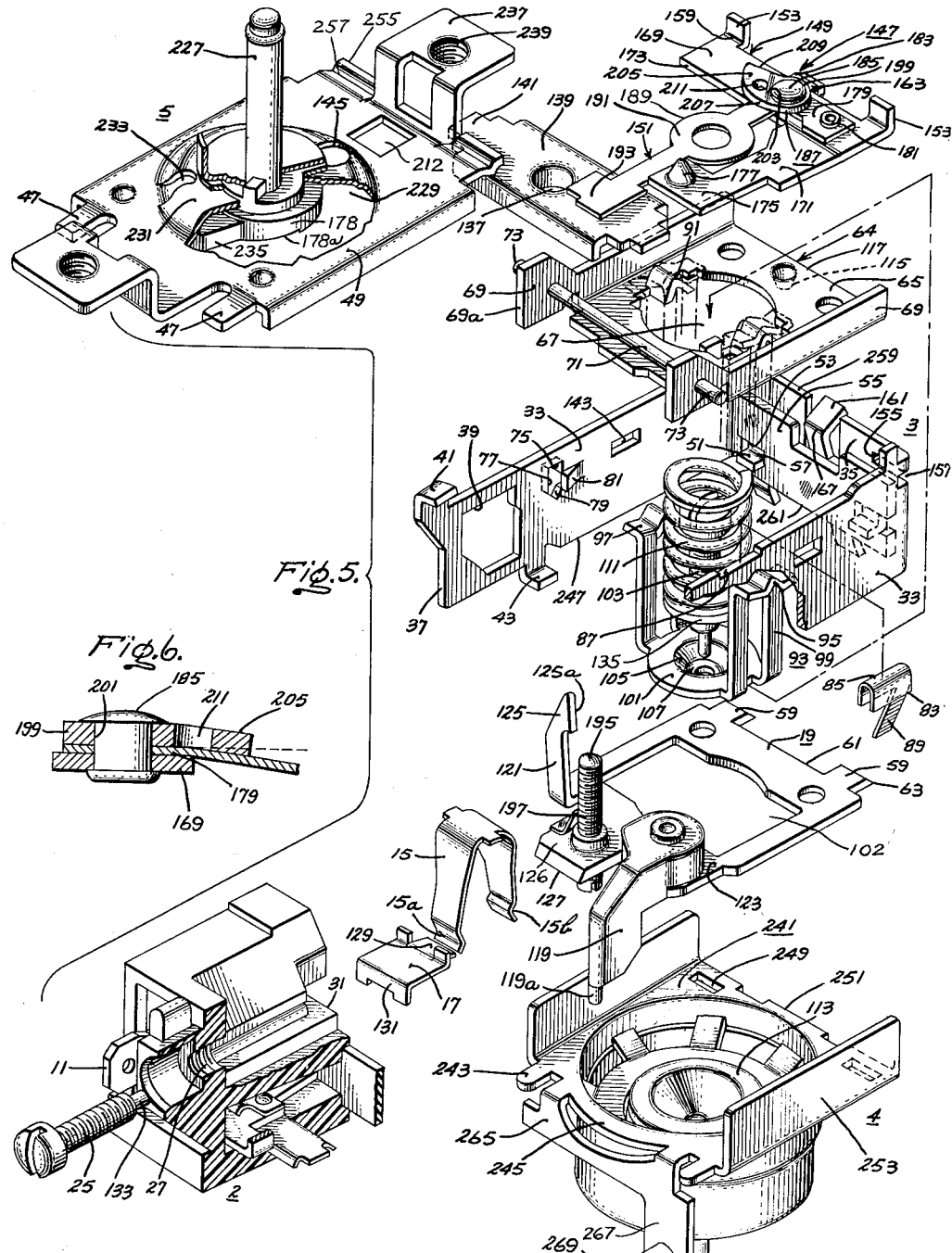

3,096,419
CONDITION RESPONSIVE ELECTRIC SWITCH MECHANISM
Louis J. Howell, Cincinnati, Ohio, assignor to General Electric Company, a corporation of New York
Filed Sept. 6, 1960, Ser. No. 54,205
8 Claims. (Cl. 200—140)

This invention relates to electric switch mechanisms, and is particularly applicable to automatic temperature control switches for use in connection with electric refrigerators.

Refrigerating machines of the conventional types, such as household refrigerators, freezers, and air-conditioning units, are customarily controlled by means of a switch which automatically starts the machine, in response to a first predetermined condition, such as a predetermined upper temperature, and subsequently stops the machine, in response to a second predetermined condition, such as a predetermined lower temperature. In such switches, a condition responsive element, such as a thermally responsive bellows, provides a mechanical force for controlling the circuit of the machine by opening or closing the contacts of the switch.

A common form of such condition responsive electric switches is a type generally referred to as a "constant-on cold control." Switches of this type are ordinarily constructed to initiate operation of associated refrigeration equipment at a constant preset upper temperature, which may, for example, be several degrees above freezing, and to terminate operation of the refrigeration equipment at a selectively adjustable lower temperature. In this type of switch, the selective adjustment of the lower temperature has no substantial effect upon the predetermined upper temperature at which the refrigeration cycle is to be initiated. The temperature differential, or the difference in the temperature between initiation and termination of the refrigerating cycle, is preset by a separate adjustment at a certain lower temperature, and this differential then varies in a predetermined manner with respect to the selective adjustment of the lower temperature.

Such a switch is expected to provide reliable and consistent sensitivity with continuous use over a long period of years, and it must be capable of efficient simplified adjustment of the predetermined conditions to which it is responsive. In the past, such condition responsive switches have included adjustment mechanisms which are complicated, inflexible, and relatively imprecise. In addition, such switches of the prior art have been relatively complex in their structure, thus adding to the over-all cost.

It is, therefore, desirable to provide a condition responsive electric switch mechanism which may be efficiently and simply adjusted for the predetermined conditions to which it is responsive. It is further desirable that such a switch be inexpensive, sturdily and simply constructed, and capable of very efficient operation.

Accordingly, it is a primary object of this invention to provide an improved condition responsive electric switch which is reliable and capable of efficient simplified adjustment.

Another object of this invention is to provide an improved condition responsive electric switch which due to its relative simplicity can be manufactured at a reduced cost.

It is a further object of this invention to provide an improved condition responsive electric switch wherein the condition at which the contacts will be actuated to one of two positions may be selectively adjusted in an improved and precise manner without substantially effecting the condition at which the contacts will be actuated to the other position.

It is a still further object of this invention to provide an improved condition responsive electric switch that is efficient in operation, sturdily constructed, and has a long life.

In carrying out my invention, in one form thereof, I provide an improved condition responsive electric switch having a pair of contacts and a contact operating member. The contact operating member is pivotally mounted to close and open the contacts when the member is moved in opposite directions between first and second positions. A snap acting spring is in continuous engagement with the contact operating member to bias the member toward the first position, where it closes the switch contacts. A condition responsive means is provided for effecting movement of the member between its positions in response to variation in external conditions. To selectively vary the condition at which the contacts of the switch will open, a special biasing spring is pivotally movable and adjustable in an improved manner within the switch. The free end of this biasing spring engages the contact operating member when the contacts are closed to bias the member toward its second position against the force of the snap acting spring. In this second position of the operating member, the contacts are open. With the switch contacts open, the pivotally movable biasing spring and the contact operating arm have a gap between them. A rotatable cam is arranged to adjust the size of this gap for varying the condition at which the contacts of the switch will open, with movement of the cam having no substantial effect upon the condition at which the contacts will close.

By further aspects of my invention, additional desirable features may be included in the switch, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

FIG. 1 is a side elevational view of an improved condition responsive electric switch embodying my invention in one form thereof;

FIG. 2 is an end view of the insulating base of the switch;

FIG. 3 is a side elevational view partially in section and partially broken away, of the switch of FIG. 1 with dotted lines representing certain alternate operating positions of certain movable parts of the switch mechanism;

FIG. 4 is a sectional view taken generally along the line 4—4 of FIG. 3;

FIG. 5 is an exploded view showing the various parts of the switch of FIG. 1 with the cover assembly, the base, and the frame, partially broken away; and FIG. 6 is a fragmentary sectional view taken along the line 6—6 of FIG. 4 to show the range adjustment provided by the adjust washer.

Referring now to FIG. 1, there is shown a temperature responsive switch 1 which embodies one form of my invention, and which is commonly referred to as a "constant-on cold control." The switch 1 includes an insulating base 2 which, for example, is formed of molded phenolic thermosetting plastic, and a U-shaped frame 3 which is formed of a suitable material such as stainless steel and is securely mounted to base 2. Frame 3 conveniently supports bellows assembly 4, which provides a temperature responsive force, and cover assembly 5, which includes means for mounting the switch upon a suitable supporting panel.

As best shown in FIGS. 2–4, insulating base 2 serves as a mounting for terminals 10 and 11, the inner portions of which are contained within a generally U-shaped internal cavity 12 of the base. Terminals 10 and 11 are fastened to base 2 by staking, and provide supports for relatively fixed contact 13 and movable contact 14 of the switch. These contacts are housed in the lower portion of cavity 12 of the base and are normally biased to their closed position, as shown in FIG. 2.

In order to furnish snap action for the contacts of my improved switch 1, U-shaped toggle spring 15 has been provided. This spring is in continuous compression between pivot member 17 and contact operating member 19, to continuously bias the contact operating member to its closed or non-acting position, away from the switch contacts. For adjusting the biasing force of spring 15, oppositely disposed channels 21 are molded into base 2. These channels are directed generally perpendicularly to terminal side 23 of the base, and support pivot member 17 for sliding movement therein. To adjustably slide pivot member 17 within channels 21, differential adjusting screw 25 engages an end flange on the pivot member, as will be further discussed hereinafter. Pivot member 17 thus operates as a linearly movable support for the left side of spring 15 (as viewed in FIG. 3), its supporting position being responsive to the rotation of differential adjusting screw 25 within threaded base aperture 27.

Besides mounting the toggle spring adjusting means and the switch contacts, base 2 also includes a pair of stops 29 and 31 which are molded therein. These stops serve to limit the movement of contact operating member 19 between its contacts open and contacts closed positions.

Frame 3 of my switch is of generally U-shaped configuration, being preferably formed by bending a single flat piece of sheet metal into oppositely disposed symmetrical legs 33 and connecting portion or bight 35, as best illustrated by the exploded view of FIG. 5. Adjacent free ends 37, each frame leg 33 includes a specially configured slot 39, and inwardly bent upper and lower tabs 41 and 43, respectively. The principal purpose of these frame slots 39 and inwardly bent tabs 41 and 43 is to provide a convenient means for supporting frame 3 upon insulating base 2. Base 2 has a pair of specially configured oppositely disposed ears 45 at two of its opposite sides, which receive the slots 39 of the frame. An outer side edge of each inwardly bent tab 43 of the frame engages the open end of the base 2 opposite terminal side 23. With the ears 45 received within slots 39 of the frame, and the side edge of each tab 43 engaging the open end of the base, tongues 47 of cover plate 49 are slipped underneath tabs 41 of the frame and serve as levers to securely mount the frame upon the base as the opposite end of cover plate 49 is pressed downwardly upon connecting portion 35 of the frame.

To efficiently operate the contacts of my switch, I pivotally support the aforementioned contact operating member 19 in frame 3. This pivotal support for member 19 is provided in portion 35 of frame 3 by inwardly turned tabs 51 which extend through slots 53 of reinforcing plate 55. Plate 55 is welded to the inner surface of bight portion 35 and the bottoms of slots 53 abut the bottoms of tabs 51 to reinforce the tabs. (See FIG. 3.) Sharp inner corners 57 are formed at the bend of each of the tabs 51. Corners 57 serve to pivotally support sharp projecting shoulders or pivots 59 of member 19 which extend rearwardly from rear end 61 thereof. This is best shown in the exploded view of FIG. 5. Each of the projecting pivots 59 has a knife edge 63 which is formed by a rear surface sloping downwardly and outwardly away from end 61. (See FIG. 3.) When the shoulders 59 of operating member 19 are mounted upon their mating tabs 51, knife edges 63 of the shoulders extend into slots 53 of the reinforcing plate, and pivot at sharp rear corners 57 of the tabs, thereby providing a precise pivotal support for the movement of the operating member within the frame.

To actuate the contact operating member 19 of the switch, I have provided an efficient and accurate means for transmitting condition responsive force thereto. Spaced above operating member 19, and in generally parallel relationship thereto, as viewed in FIG. 3, there is pivotally mounted an intermediate force transmission lever 64. Lever 64 (as best seen in FIG. 5) includes body section 65 with an opening 67 therein, side flanges 69 which extend upwardly in a generally perpendicular fashion from opposite sides of body section 65, and bearing shaft 71 which extends through aligned apertures formed in the front end 69a of each side flange and is staked to these apertures to provide projecting trunnions 73. The axis of shaft 71 is generally parallel to the plane of body section 65 of lever 64. Trunnions 73 are positioned in slots 75 which are formed in legs 33 of frame 3 adjacent slots 39 and are oppositely disposed therein to rotatably support lever 64. Slots 75 each include a rectangular upper section 77, and a biangular base 79. (See FIG. 5.) The biangular base 79 provides two smooth intersecting bearing surfaces for accurately rotatably supporting each of the trunnions 73. To laterally position intermediate lever 64 upon frame 3 in a precise manner, lanced tab 81 is struck inwardly from one of the legs 33, and a slack reducing spring 83 is positioned upon the other leg. Tab 81 abuts one of the side flanges 69 to limit lateral movement of lever 64 toward leg 33 on which the tab is formed. Spring 83 includes a U-shaped support 85 which brackets recess 87 in the upper edge of the other leg 33 and includes an inwardly and downwardly extending leaf spring 89 that engages the adjacent flange 69 to resiliently limit lateral movement of lever 64 toward spring 83. (See FIG. 4.)

Spaced between the front and rear ends of body section 65 of the intermediate lever 64 (as viewed in FIG. 5) are a pair of raised oppositely disposed knife edges 91. The purpose of edges 91 is to provide accurate pivots for supporting bearing 93 thereon. Bearing 93, as will become apparent hereinafter, furnishes a means for transmitting bellows force to operating member 19 through intermediate lever 64. Knife edges 91 are configured cross-sectionally in the shape of an inverted V, and they project transversely inwardly toward the center of opening 67 of the lever 64, to receive grooves 95 of the bearing 93. Grooves 95 are also in the configuration of an inverted V so that when bearing 93 pivotally rests upon lever 64, distinct pivot locations are provided by knife edges 91 of the lever and the lines of mating contact of grooves 95 adjacent the apexes of these grooves.

As shown in FIG. 5, bearing 93 includes upper shoulders 97 within which aforementioned grooves 95 are formed, depending parallel pairs of struts 99, and base 101. It should be noted that upper shoulders 97 of bearing 93 sit above knife edges 91 of lever 64, as shown in FIG. 3, but that bearing 93 is shown underneath lever 64 in FIG. 5 for purposes of space economy in the exploded view of FIG. 5. When it is mounted on knife edges 91, bearing 93 extends downwardly through lever opening 67 and operating member opening 102, respectively, as shown in FIG. 3. To provide a force transmitting seat for altitude adjusting screw 103, cup-shaped recess 105 is formed in base 101, and it has a slightly flattened annular seat 107 upon which conical shoulder portion 109 of screw 103 rests. The primary function of bearing 93 is to transmit the difference force between altitude spring 111 and bellows 113 to the operating member 19, through intermediate lever 64.

To transmit condition responsive force from bearing 93 to operating member 19 through lever 64, a projecting boss 115 has been formed on the undersurface of body section 65 thereof adjacent the rear end 117 of the lever 64. (See FIG. 5.) Condition responsive force is thus transmitted from bellows 113 to bearing 93, with the bearing transmitting the difference between the force of the bellows and the altitude spring to knife edges 91 of lever 64. Intermediate lever 64 then pivots upon its trunnions 73, and projecting boss 115 of lever 64 engages an adjacent surface of operating member 19 near shoulders 59 thereof to pivot member 19 about its knife edges 63. By arranging lever 64 and operating member 19 in a generally parallel manner (as shown in FIG. 3), and with their pivotal supports located at opposite ends, it should be noted that the movement of projecting boss 115 in response to any given condition responsive force exerted upon knife edge 91 by the bearing, will be greater in magnitude than the movement of the knife edges 91. In addition, the movement of free actuating end 119 of the operating member 19 will be greater in magnitude than the movement of projecting boss 115 for any given condition responsive force, because of the greater distance of the free end 119 of member 19 from pivots 59 thereof. By using a lever and contact operating member in this manner, it has been found possible to substantially multiply the movement of the free end or actuating end of the operating member in response to any condition responsive force, thus materially enhancing the control of tolerances in my switch 1.

To provide direct and immediate manual "off" control of operating member 19, manual stop extension 121 is spaced forwardly from one side of front end 123 of the operating member (as shown in FIG. 5), and it projects upwardly in a direction generally perpendicular to the face of the operating member. Upwardly directed point 125 is provided on this extension to contact a manually adjustable control means for opening the switch contacts. This manually adjustable control means forms an important aspect of the present invention and it will be further described in detail hereinafter.

To provide a means for continually biasing operating member 19 in the direction of the closed and non-actuated position of the switch contacts, or with a continuous clockwise moment of biasing force about knife edges 63 (as shown in FIG. 3), I have provided the previously mentioned U-shaped toggle spring 15. As best shown in FIGS. 3 and 5, toggle spring 15 has grooved or indented end portions 15a and 15b for mounting the spring in continuous compression between pivot member 17 and operating member 19 respectively. Knife edge 127 is formed in a forward end tongue 126 of member 19 to engage indented portion 15b of the toggle spring and thereby receive the transmission of the continuous biasing force of the toggle spring.

To support the indented or pivoting edge 15a of toggle spring 15, pivot member 17 has a central knife edge 129 which inclines slightly downwardly (as best viewed in FIG. 5) to engage indented portion 15a of the spring, forming a knife edge contact therewith. On the side opposite to downwardly inclined knife edge 129, pivot member 17 has a downwardly extending flanged end 131 engaged by the leading or forward end 133 of differential adjusting screw 25. As previously described, by manual rotation of screw 25, it can thus move pivot member 17 toward or away from toggle spring 15, and the compression of the toggle spring 15 may thereby be adjusted by the knife edge contact between edge 129 of the pivot member and indented edge 15a of the toggle spring. Channels 21 serve to guide the movement of the sliding pivot member so that pivoting edge 15a of the toggle spring is moved horizontally (as viewed in FIG. 3) with a linear motion. Axial movement of screw 25 thus varies the biasing force supplied by the toggle spring and thereby alters the temperature differential (i.e., difference between "on" and "off" temperatures for a particular manually adjusted "off" temperature setting) of the cold control, while pivot member 17 sliding within channels 21 precludes any significant vertical movement of the indented pivoting edge 15a of the toggle spring. (See also FIG. 2.)

As previously noted, base 2 has molded therein fixed stops 29 and 31. These stops engage forward end tongue 126 of the operating member to limit the upward and downward movement thereof between two fixed points. By limiting the movement of the operating member between the stops 29 and 31, the possibility of reaching the limits of the particular toggle spring is thereby precluded. Thus at all times, the biasing force provided by the toggle spring is within the most desirable range of the spring potential.

To provide a continuous downward biasing force upon bearing 93 (viewing FIG. 3), which thus results in a continuous clockwise moment of biasing force upon lever 64 about its trunnions 73 and a continuous counterclockwise moment of biasing force upon operating member 19 about its knife edges 63, I have utilized the previously referred to altitude spring 111. Altitude spring 111 transmits its compressive force to altitude screw 103 via nut 135 which is threaded thereto. By varying the compression of altitude spring 111, the temperature level or band at which my "constant-on cold control" operates (i.e., the temperature response level for the "on" temperature) may be preset. More particularly, the upper end of altitude spring 111 extends around or encircles a downwardly extending flanged aperture 137 which is formed in a rigid cross bar 139. Bar 139 has a pair of oppositely disposed tabs 141 which extend through opposed slots 143 formed in the frame legs 33. With altitude spring 111 thus running in compression between bar 139 and its threaded nut 135, a suitable tool may be inserted through aperture 145 of cover plate 49 to engage the head of screw 103 and thus vary the compression of the spring by rotation of the screw with respect to its threaded nut. (See FIG. 3.) It will thus be seen that by rotating altitude screw 111, a convenient means has been provided for varying the temperature response level for the "on" temperature of switch 1. The "off" temperature is selectively adjustable by a separate and independent means as shall be described in detail hereinafter.

To enable my switch 1 to be efficiently adjusted for the desired temperature response at which the contacts open (i.e., "off" temperature) while at the same time allowing the temperature at which the contacts will close (i.e., "on" temperature) to remain substantially unaffected by this adjustment, as shown in FIGS. 3 and 5, switch 1 includes a special cam follower assembly 147. This assembly comprises an L-shaped cam follower 149 which is pivotally supported in connecting portion 35 of frame 3, and a biasing spring 151 which is mounted in cantilever fashion upon the cam follower 149 and pivotally movable therewith. More particularly, cam follower 149 is pivotally mounted to connecting portion 35 of frame 3 by means of fingers 153 which are bent perpendicularly upward (as viewed in FIG. 5) from the rear corners of the follower and engage the upper edge 155 of spaced slots 157 formed at the corners of connecting portion 35. (See FIGS. 3, 4, and 5.) Sharp inner edges or corners 159 are formed at the base of fingers 153. To provide a slight upward biasing of inner edges 159 of fingers 153 against upper edges 155 about which the cam follower pivots, spring tab 161 is also provided in frame connecting portion 35. Tab 161 is spaced between slots 157 and is bent slightly inwardly and then outwardly from connecting portion 35 (as viewed in FIG. 5). Tab 161 engages central nose 163 of cam follower 149 to furnish a spring biasing force against rear edge 165 of the follower. The nose 163 specifically engages and is biased by inwardly extending shoulder portion 167 of the tab 161. Fingers 153 of cam follower 149 extend upwardly from base section 169 thereof.

From the near side of follower base section 169, as shown in FIG. 5, arm 171 is extended outwardly from forward edge 173 and in a slightly angular upward direction from section 169, as shown in FIG. 3. Free end 175 of arm 171 has a generally conical bump or boss 177 facing upwardly therefrom, as shown in FIG. 5. Bump 177 has a rounded outer tip, and is responsive to the rotary positioning of cam 178, as shall be described in detail hereinafter, to vary the pivotal position of cam follower 149. Between the sides of base section 169, on the upper surface thereof, the supported end 179 of spring 151 is attached to the upper surface thereof. (See FIG. 5.) More specifically, eyelet 181 fastens one side of the supported end 179 to the cam follower, and corner 183 of spring 151 is attached to base section 169 by means of rivet 185. Between the head of rivet 185 and corner 183 of bias spring end 179, as a further and very important aspect of my invention, range adjust washer 187 has been provided. Washer 187 is rotatably adjustable to vary the gradient of biasing spring 151, and the structural and functional aspects thereof shall be discussed in detail hereinafter.

Turning now to the further structure of the biasing spring 151, as shown in FIG. 5, it will be noted that this spring is somewhat key-shaped in appearance. Main section 189 of the spring extends outwardly in cantilever fashion from rivet 185, with an intermediate ring or annulus 191 being formed between free end section 193 and corner 183. Ring 191 provides an access aperture so that a tool may be extended through aperture 145 of cover plate 49 to engage altitude screw 103 for adjustment purposes. Underneath the free end section 193 of spring 151, bias spring adjust screw 197 is positioned generally perpendicularly thereto. The screw 197 is extended upwardly through a threaded recess near the knife edge 127 of operating member 19, being thus attached to and movable with the member. (See FIG. 3.) The cylindrically configured upper end 195 of screw 197 underlies and is adjacent to free end section 193 of spring 151. When switch 1 has been substantially assembled, the bias spring adjusting screw 197 is rotated into such a position as to maintain a functional gap A with respect to free end section 193 when the control contacts are in an open or "off" position and to continuously engage the free end of the biasing spring 151 for all cam positions when the cold control contacts are in the closed or "on" position. With this arrangement, biasing spring 151 is pivotally movable and adjustable by the rotation of cam 178, and will have little or no effect upon the "on" temperature to which switch 1 will respond, due to the existence of gap A when the control contacts are open. When the control contacts are in the closed position, the biasing spring engages screw 197, and it will thus effect the "off" temperature response by providing a biasing force which yieldingly resists the biasing force furnished to the operating member 19 by the toggle spring 15.

As best seen in FIGS. 5 and 6, the range adjusted washer includes a flat supporting section 199 with an aperture 201 (FIG. 6) therein for receiving the shank of rivet 185, and is creased angularly with respect to section 199 along line 203 to provide a slightly canted section 205 (FIG. 6). Section 205 includes an arcuate edge 207 (as best shown in FIG. 4) which generally intersects a straight side edge 209, and adjust aperture 211 which is spaced from both of these edges and adjacent line 203. By inserting an appropriate tool in aperture 211 of washer 187, the adjust washer may be rotated about the shank of rivet 185 to alter the spring gradient of biasing spring 151. More particularly, as washer 187 rotates about rivet 185, due to the curvature of section 205 provided by arcuate edge 207 thereof, the distance from its axis of rotation of the section of the arcuate edge 207 which overlies and engages spring 151, is varied to alter the spring gradient of spring 151. To explain the operation of the adjust washer 187 in another manner, by rotatably varying the area of canted section 205 of the washer which depends forwardly from forward edge 173 of the cam follower (viewing FIG. 5), the spring gradient of bias spring 151 may be conveniently and efficiently varied. By varying the spring gradient of spring 151 in my improved switch 1, different ranges (i.e., differences between extreme cold and warm "off" temperatures for a given cam) may be expeditiously obtained. Aperture 212 is formed in cover plate 49 to afford ready access to adjust aperture 211 of the washer after the cold control has been assembled.

Turning now to a discussion of the new and improved external means for pivotally adjusting the size of functional gap A in my switch 1, as illustrated in FIG. 3, rotatable cam 178 has been provided. Cam 178 is rotatably mounted on cover plate 49 by shaft 227 and it is positioned to rotatably engage the conical bump 177 of cam follower 149. Follower 149 is thus pivotally responsive to the rotary position of cam 178, and since the bias spring 151 is mounted in cantilever fashion upon follower 149, the position of free end 193 may be pivotally altered by rotation of the cam to vary the size of gap A. Cam 178 may be constructed of die cast zinc and is of the constant rise type, including the gradual sloping surface 178a. (See FIG. 5.) Sloping surface 178a engages bump 177 to pivotally vary the position of the free end of bias spring 151. To facilitate the manual rotation of cam 178, shaft 227 is secured thereto by some suitable means such as a press fit. Most of the cam is disposed in circular recess 229 which is formed within raised annulus 231 of cover plate 49. (See FIG. 5.) To provide a limiting stop for the rotation of cam 178, downwardly lanced portion 233 projects slightly into recess 229, to engage lateral extension 235 of cam 178. (See FIGS. 3 and 5.) Extension 235 also serves to contact rearward facing surface 125a of point 125 on extension 121 of operating member 19 to provide a direct "manual-off" pivoting movement of operating member 19 for immediately opening the switch contacts.

For mounting switch 1 to a suitable supporting panel, mounting extensions 237 are provided at each end of cover plate 49. Each extension includes a threaded aperture 239 to engage a suitable mounting screw.

Turning now to the bellows assembly 4 of my switch, I have provided bellows cup or housing 241 for supporting and containing bellows 113. To securely mount bellows cup 241 upon frame 3, a pair of spaced toes 243 (as shown in FIG. 5) extend outwardly from inner end 245 of the cup to engage lower tabs 43 of the frame by conveniently slipping underneath them. Tabs 43 of the frame thus serve the twofold purpose of both engaging the base to help mount the frame thereon, and receiving toes 243 of the bellows cup 241 to help mount the bellows assembly thereon. For locking the bellows assembly rigidly against lower edge 247 of each frame leg, a pair of spaced slots 249 are provided on the bellows cup, each of which is adjacent to outer end 251 and sides 253. Adjacent to rear end 255 of cover plate 49, a pair of spaced laterally extending indentations 257 are formed in the upper surface thereof. For rigidly clamping rear end 255 of cover plate 49 and outer end 251 of bellows cup 241 against upper edge 259 and lower edge 261, respectively, of frame connecting portion 35, two spring clips 263 have been provided. Each of these clips compresses the adjacent ends of cover plate 49 and bellows cup 241 against the opposite edges of connecting portion 35, by resiliently engaging an indentation 257 of the cover and an oppositely disposed slot 249 of the bellows cup. This fastening arrangement is best shown in FIG. 3.

Bellows cup 241 also includes a depending flange 265 with projecting arm 267 extending therefrom for supporting capillary 269. Capillary 269 is connected to a suitable bulb 271 and contains a thermally responsive fluid such as methyl chloride or dichlorodifluoromethane.

To furnish a temperature responsive actuating force for the switch 1, bellows 113 is mounted within the bellows cup 241. A restraining annulus having supporting arms fitted into an annular groove in the inner wall of the bellows cup, restricts the upward movement of bellows 113 (viewing FIG. 5). To provide the transmission area for the temperature responsive force, bellows 113 has a central conically-shaped recess 113a within which a smaller recess 113b is also contained. Recess 113b receives the lower tip of altitude screw 103 and has an upwardly projecting nose centrally disposed therein, which bears against the lower tip of the altitude screw. Altitude screw 103 also receives the downward biasing force of altitude spring 111 and transmits the difference of the forces between spring 111 and bellows 113 to bearing 93. More specifically, annular conical shoulder 109 of altitude screw 103 transmits this difference force to bearing 93 by engagement with flattened annular seat 107 thereof (FIG. 5), and bearing 93 actuates the operating member 19 through its engagement with intermediate lever 64.

Considering now the operation of the improved "constant-on" condition responsive switch mechanism which I have disclosed, let us first assume that my switch is utilized with a refrigeration machine, to control the compressor unit thereof by means of opening and closing its electrical contacts in response to bulb or capillary temperature. Assuming that the bulb or capillary is at a temperature slightly above the "on" temperature of the cold control, the contact operating member 19 would then be in the position 19a, as shown by the dotted lines of FIG. 3, with the contacts biased to their normally closed position, and the cylindrically configured end 195 of bias spring adjust screw 197 in engagement with the free end 193 of spring 151. At this position, the load on lever 64 at knife edge pivot points 91 is relatively low, being only enough to maintain engagement of the bearing 93 with the lever 64 and altitude screw 103, at knife edges 91 and shoulder 109, respectively. (See FIG. 3.) At this time, the bellows force substantially opposes the altitude spring force, and the toggle spring 15 is holding the operating arm against stop 29 (FIG. 2). Toggle spring 15, which is shown by dotted line 15c in FIG. 3, is then in a position off of dead center its maximum distance. It, therefore, supplies its maximum biasing force against knife edge 127 of operating member 19. The moment of the toggle spring biasing forces is opposed by the moment of a biasing force urged upon member 19 by the free end of spring 151, which has been moved to the dotted position represented in FIG. 3, due to the engagement of screw 197 therewith. (See also FIG. 5.) Bearing 93 can swivel about shoulder 109 of altitude screw 103 as necessary to transmit the difference of the altitude spring force and the bellows force to knife edges 91 of lever 64. Boss 115 of lever 64 pivots on its trunnions to transmit actuating force to operating member 19 as a force moment about pivoting knife edges 63 of the operating member.

With the compressor of the refrigeration machine then in operation due to the contacts of the switch being closed, substantial cooling in the vicinity of the bulb or capillary tube of the bellows assembly ensues. As the compressor pulls down the temperature, the capillary or bulb senses this dropping temperature and consequently causes the temperature responsive fluid contained therein to decrease the internal vapor pressure on the bellows. The force exerted upwardly upon altitude screw 103 by the bellows thus gradually decreases, and the temperature drop causes an increasing resultant downward force to be exerted upon lever pivot points 91 by spring 111. The biasing force of toggle spring 15 upon knife edge 127 of operating member 19 is continuous and has a clockwise moment about pivot points 63 of the contact operating member (as viewed in FIG. 3). The biasing force urged upon screw 197 of the contact operating member 19 is also continuous and is effected as a counterclockwise moment about pivot points 63 of the operating member (as viewed in FIG. 3). The resultant difference force between spring 111 and bellows 113 is represented as a clockwise moment at boss 115 about lever trunnions 73 and a resultant counterclockwise moment transmitted to operating member 19 about its pivot edges 63. When the temperature reaches a point where the counterclockwise moment of force transmitted to member 19 by bearing 93 plus the counterclockwise moment of biasing force applied to member 19 by spring 151, just exceeds the clockwise moment of the toggle spring biasing force at knife edge 127 of member 19, the operating member 19 snaps to the solid or lower position as shown in FIG. 3. The contacts are thus opened, by the downward movement of pin 119a of free end 119 of the operating member against an extension of the leaf spring strip which carries movable contact 14. (See FIG. 4.) With the contacts open, the circuit to the compressor motor is opened, interrupting the cooling operation.

With the operating member in its contacts open position against stop 31, the toggle spring is in position 15 (as shown in FIG. 3), a minimum distance from its dead center position, and thereby produces a slight but definite clockwise biasing force upon the operating member. Upper end 195 of screw 197 is spaced from spring 151 by gap A and therefore has no effect upon the switch actuating forces when the switch is in this position. As the temperature of the capillary or bulb then starts to increase, the vaporization of some of the fluid therein causes the bellows internal pressure to increase accordingly. At first, the bellows will not move because the force of the altitude spring is sufficiently greater than the opposing force of the bellows. But, with further temperature increase in the vicinity of the capillary or bulb, the bellows internal pressure increases until the bellows force becomes closer to the altitude spring force, and the counterclockwise moment of the force transmitted by bearing 93 and lever 64 to operating member 19 is exceeded by the small clockwise moment of the toggle spring biasing force. At this point, the spring 15 toggles the contact operating member to its upper position. This, of course, allows the contact to move to the "on" position and again energizes the circuit to the compressor.

To adjust the differential temperature of the control switch, and thus vary the difference between the "on" and "off" temperatures of the control, one needs merely to rotate the differential adjusting screw 25 which is externally accessible from the terminal side of insulating base 2. This adjustment is physically distinct from the individual "on" and "off" adjustments, respectively, thus affording flexibility in my switch 1.

For varying the temperature level or band at which the switch is responsive to open and close its contacts, altitude screw 103 is rotated. This varies the compression on spring 111. Increasing the range spring compression means that added bellows pressure is required for operating member 19 to toggle to the "on" position, and therefore increases the temperature level at which the contacts of the cold control will respond. The rotation of the screw 103, in other words, raises or lowers the "on" and "off" temperature together, while not materially affecting the differential therebetween.

For varying the "off" temperature to which my switch is responsive, shaft 227 is rotated, thus causing cam 178 to pivot cam follower assembly 147 about corners 159 of the cam follower. Corners 159 of the follower pivot about upper edges 155 of slots 157, due to the biasing engagement of shoulder portion 167 with nose 163. Since adjustable gap A exists between bias spring end 193 and bias adjust screw 197 when the switch contacts are open, varying the "off" temperature by rotation of cam 178 has no substantial effect upon the predetermined "on" temperature. By rotating range adjust washer 187, as previously set forth, the spring gradient of spring 151 may be conveniently varied to alter the range (i.e., difference between extreme cold and warm "off" settings for a particular cam).

It will thus be seen that by means of cam follower assembly 147, I have provided an efficient accurately mounted biasing spring for a "constant-on cold control" switch, which spring is pivotally movable and adjustable on a cam follower. In addition, by means of my invention, the biasing spring 151 is cantilever mounted in such a manner that the spring gradient thereof may be readily varied via a canted adjust washer which rotatably engages the spring. "Constant-on cold controls" embodying my invention are reliable, efficient in operation, and may be manufactured at a reduced cost. It will further be seen that by means of my invention, a new and improved means for adjusting the "off" temperature without substantially effecting the preset "on" temperature has been expeditiously obtained.

While in accordance with the patent statutes, I have described what at present is considered to be the preferred embodiment of my invention, it will be obvious to those skilled in the art that various changes and modifications may be made therein without departing from the invention, and I, therefore, aim in the following claims to cover all such equivalent variations as fall within the true spirit and scope of this invention.

What I claim as new and desire to secure by Letters Patent of the United States is:

1. A condition responsive switch comprising a pair of contacts, a contact operating member pivotally mounted to close and open said contacts when said member is moved about its pivot in opposite directions between first and second positions, snap action spring means in continuous engagement with said member for producing snap action thereof between said positions, condition responsive means for effecting movement of said member between said positions in response to predetermined variations in external conditions, a pivotally movable spring having a free end engageable by said member when said member is in the first position to bias said member toward the second position, the free end of said spring and said contact operating member having a gap therebetween when said member is in the second position, and a rotatable cam operatively associated with said spring and arranged to pivot said spring thereby to adjust the size of said gap for varying the condition at which the member will move to the second position but having no substantial effect upon the condition at which said member will move to said first position.

2. A condition responsive switch comprising a pair of contacts, a contact operating member pivotally mounted to close and open said contacts when said member is moved about its pivot in opposite directions between first and second positions, snap acting spring means in continuous engagement with said member for producing snap action thereof between said positions, condition responsive means for effecting movement of said member between said positions in response to predetermined variations in external conditions, a pivotally mounted cam follower, a biasing spring supported in cantilever fashion at one of its ends upon said follower and having a free end engageable by said member when said member is in the first position to bias said member toward the second position, the free end of said spring being spaced apart from said member by a gap when said member is in the second position, and a rotatable cam engageable with and arranged to pivot said follower thereby to adjust the size of said gap for varying the condition at which the member will move to the second position but having no substantial effect upon the condition at which said member will move to said first position.

3. A condition responsive switch comprising a frame, a pair of contacts, a contact operating member pivotally mounted upon said frame to close and open said contacts when said member is moved about its pivot in opposite directions between first and second positions, snap acting spring means in continuous engagement with said member for producing snap action thereof between said positions, condition responsive means for effecting movement of said member between said positions in response to predetermined variations in external conditions, a cam follower pivotally mounted upon said frame, said follower having a pair of spaced tabs projecting first outwardly and then perpendicularly away from one edge thereof, a pair of slots formed in one wall of said frame for receiving said tabs, and a spring tab formed in said wall between said slots and continuously engaging said edge between said tabs thereby to bias said tabs into pivotal engagement with said slots and bias said follower away from said operating member, a spring supported in cantilever fashion upon said follower, said spring having a free end engageable by said member when said member is in the first position to bias said member toward a second position, said spring and said contact operating member having a gap therebetween when said member is in the second position, and a rotatable cam engageable with a free end of said follower and arranged to pivot said follower thereby to adjust the size of said gap for varying the condition at which the member will move to the second position but having no substantial effect upon the condition at which said member will move to said first position.

4. A condition responsive switch comprising a pair of contacts, a contact operating member pivotally mounted to close and open said contacts when said member is moved about its pivot in opposite directions between first and second positions, snap acting spring means in continuous engagement with said member for producing snap action thereof between said positions, condition responsive means for effecting movement of said member between said positions in response to predetermined variations in external conditions, a pivotally mounted cam follower, a biasing spring supported in cantilever fashion at one of its ends upon said follower and having a free end engageable by said member when said member is in the first position to bias said member toward the second position, the free end of said spring being spaced apart from said member by a gap when said member is in the second position, a rotatable adjust washer attached to said spring, said washer being rotatably mounted with respect to and in face-to-face relationship with said spring adjacent its supported end and engageable therewith to vary the spring gradient of said spring, and a rotatable cam engageable with a free end of said follower thereby to adjust the size of said gap for varying the condition at which the member will move to the second position but having no substantial effect upon the condition at which said member will move to said first position.

5. A condition responsive switch comprising a pair of contacts, a contact operating member pivotally mounted to close and open said contacts when said member is moved about its pivot in opposite directions between first and second positions, snap acting spring means in continuous engagement with said member for continuously urging said member toward the first position, condition responsive means for effecting movement of said member between said positions in response to predetermined variations in external conditions, a pivotally mounted cam follower, a biasing spring supported in cantilever fashion at one of its ends upon said follower by a fastening means including a stud, said spring having a free end engageable by said member when said member is in the first position to bias said member toward the second position, the free end of said spring being spaced apart from said member by a gap when said member is in the second position, an adjust washer rotatably attached to said spring by said stud, said washer having at least one section canted toward said spring and including a curved outer edge, said curved outer edge having an adjustably variable distance from the axis of rotation of said washer and engaging the spring at said variable distance thereby to adjust the spring gradient of said spring, and a rotatable cam engageable with a free end of said follower thereby to adjust the size of said gap for varying the condition at which the member will move to the second position but having no substantial effect upon the condition at which said member will move to said first position.

6. A condition responsive switch comprising a means for transmitting condition responsive force to said switch, a lever having pivoted and free ends and arranged to receive said force at a section thereof intermediate said ends thereby to effect rotary movement of the free end of said lever about its pivoted end, said lever having a force transmission section toward the free end thereof from said intermediate section, a pair of contacts, a contact operating member having pivoted and free ends and arranged to receive condition responsive force transmitted thereto by said lever, said member having a force receiving section disposed between the free end pivoted ends of said member and a contact actuating section disposed toward the free end thereof from said receiving section, said force transmission section of said lever being engageable with said force receiving section of said member in response to the rotary movement of said lever to pivot said member between first and second positions thereby to actuate said contacts by corresponding movement of said actuating section, a pivotally adjustable spring having a free end engageable by said member when said member is in the first position to bias said member toward the second position, said spring and said contact operating member having a gap therebetween when said member is in said second position, and a rotatable cam operatively associated with and arranged to pivot said spring thereby to adjust the size of said gap for varying the condition at which the member will move to said second position but having no substantial effect upon the condition at which said member will move to said first position.

7. A condition responsive switch comprising a means for transmitting condition responsive force to said switch, a lever having pivoted and free ends and arranged to receive said force at a section thereof intermediate said ends thereby to effect rotary movement of the free end of said lever about its pivoted end, said lever having a force transmission section adjacent the free end thereof, a pair of contacts, a contact operating member disposed in generally parallel relationship to said lever and having pivoted and free ends, the free end of said member being adjacent to said contacts and engageable therewith thereby to actuate said contacts, said member having a force receiving section adjacent the pivoted end of said member, said force transmission section of said lever being engageable with said force receiving section of said member in response to the rotary movement of said lever to pivot said member between first and second positions thereby to actuate said contacts, a pivotally mounted cam follower, a biasing spring supported in cantilever fashion at one of its ends upon said follower and having a free end engageable by said member when said member is in the first position to bias said member toward the second position, the free end of said spring being spaced apart from said member by a gap when said member is in the second position, and a rotatable cam engageable with a free end of said follower and arranged to pivot said follower thereby to adjust the size of said gap for varying the condition at which the member will move to said second position but having no substantial effect upon the condition at which said member will move to said first position.

8. A condition responsive switch comprising a frame, a pair of contacts, a contact operating member pivotally mounted upon said frame to close and open said contacts when said member is moved about its pivot in opposite directions between first and second positions, snap acting spring means in continuous engagement with said member for producing snap action thereof between said positions, condition responsive means for effecting movement of said member between said positions in response to predetermined variations in external conditions, a cam follower pivotally mounted upon said frame, said follower having a pair of spaced tabs projecting first outwardly and then perpendicularly away from one edge thereof, a nose formed on said one edge between said tabs, a pair of slots formed in one wall of said frame for receiving said tabs, and a spring tab formed in said wall between said slots and continuously engaging said nose thereby to bias said tabs into pivotal engagement with said slots and bias said follower away from said operating member, a biasing spring supported in cantilever fashion at one of its ends upon said follower by a fastening means including a stud, said spring having a free end engageable by said member when said member is in the first position to bias said member toward the second position, the free end of said spring being spaced apart from said member by a gap when said member is in the second position, an adjust washer rotatably attached to said spring by said stud, said washer having at least one section canted toward said spring and including a curved outer edge, said curved outer edge having an adjustably variable distance from the axis of rotation of said washer and engaging the spring at said variable distance thereby to adjust the spring gradient of said spring, and a rotatable cam engageable with a free end of said follower thereby to adjust the size of said gap for varying the condition at which the member will move to the second position but having no substantial effect upon the condition at which said member will move to said first position.

References Cited in the file of this patent
UNITED STATES PATENTS

| | | |
|---|---|---|
| 1,903,459 | Johnsson | Apr. 11, 1933 |
| 2,713,579 | Raney | July 5, 1955 |